United States Patent [19]
Forehand et al.

[11] Patent Number: 5,859,738
[45] Date of Patent: *Jan. 12, 1999

[54] HEAD POSITIONING IN STORAGE SYSTEM DURING PERIODS OF INACTIVITY

[75] Inventors: Monty A. Forehand, Yukon; William C. Little, Edmond; Mukund C. Rao, Oklahoma City, all of Okla.; Krishna R. Malakapalli, Burnsville, Minn.; Mark A. Gaertner, Woodbury, Minn.; Todd P. Fracek, Lakeville, Minn.; Dallas W. Meyer, Burnsville, Minn.; Brian W. Sudman, Eden Prairie, Minn.; Joseph S. Stoutenburgh, Jr., Hopkins, Minn.

[73] Assignee: Seagate Technology, Inc., Scotts Valley, Calif.

[*] Notice: This patent issued on a continued prosecution application filed under 37 CFR 1.53(d), and is subject to the twenty year patent term provisions of 35 U.S.C. 154(a)(2).

[21] Appl. No.: 680,352

[22] Filed: Jul. 15, 1996

[51] Int. Cl.$^6$ .................................................. G11B 21/02
[52] U.S. Cl. .......................................... 360/75; 360/78.08
[58] Field of Search ..................................... 360/105, 106, 360/103, 75, 71, 51, 69, 78.08, 78.04

[56] References Cited

U.S. PATENT DOCUMENTS

| | | | |
|---|---|---|---|
| 4,384,311 | 5/1983 | McNeil | 360/128 |
| 4,445,188 | 4/1984 | Barrett | 360/106 |
| 4,594,617 | 6/1986 | Tezuka | 360/73 |
| 4,700,247 | 10/1987 | Shibata | 360/99 |
| 4,751,595 | 6/1988 | Kishi et al. | 360/75 |
| 4,866,554 | 9/1989 | Stupeck et al. | 360/75 |
| 5,345,347 | 9/1994 | Hopkins et al. | 360/71 |
| 5,384,675 | 1/1995 | Crawforth et al. | 360/75 |
| 5,408,369 | 4/1995 | Miura et al. | 360/75 |
| 5,452,277 | 9/1995 | Bajorek et al. | 360/75 |
| 5,602,691 | 2/1997 | Iwabuchi | 360/75 |

FOREIGN PATENT DOCUMENTS

| | | | |
|---|---|---|---|
| 3-62374 | 7/1989 | Japan | 360/75 |

*Primary Examiner*—Nabil Hindi
*Attorney, Agent, or Firm*—Westman, Champlin & Kelly, P.A.

[57] ABSTRACT

A magnetic disc storage system includes a magnetic storage disc and a transducing head. During periods of inactivity the transducing head is dithered whereby the head is moved to tracks on the disc according to a number of criteria. The criteria includes wear reduction, power reduction, avoidance of textured zones, head cycling, increased fly height and clearing of debris carried on the head.

17 Claims, 5 Drawing Sheets

HEAD POSITIONING IN STORAGE SYSTEM DURING PERIODS OF INACTIVITY

BACKGROUND OF THE INVENTION

The present invention relates to magnetic disc storage systems. More specifically, the present invention relates to a system for dithering heads in a magnetic disc storage system.

Magnetic disc storage systems are used to magnetically store information. Typically, a storage system includes a number of discs, each side of which carry magnetically coded information. The information on the disc is read and written using magnetic heads which are carried on the end of the actuator arms. Both thin film inductive heads and magnetoresistive (MR) heads are used in disc drives. Information is carried on the disc in the form of data residing on tracks which are divided into sectors. Tracks are also referred to as cylinders.

Information is written to or read from the disc by positioning a magnetic head over a desired cylinder of a desired disc. The disc spins at a high speed and the head therefore moves relative to the surface of the disc. Rotation of the disc relative to the head provides a lifting force on a slider body which carries the head. The head is an extremely delicate component and "flies" (due to the lifting force) very close to the disc surface. This causes a number of design problems, primarily wearing of the head due to occasional and accidental contact with the disc surface.

During periods of inactivity, some disc drives have attempted to control the radial position of the head to achieve desirous results. Specifically, it has been known to "dither" the head over the cylinders which yield the highest fly height thereby reducing wear of the head due to contact with the disc surface. Additionally, the dithering can be tuned to reduce power consumption by limiting movement to those cylinders which require less power to maintain flight of the head. Dithering is used because it is impractical and would result in excessive wear to spin down the disc during short periods of inactivity. At the same time, simply leaving the head flying at its most recent track could lead to wear and increased power consumption. However, the prior art has failed to recognize and fully utilize the benefits that can be achieved through dithering.

SUMMARY OF THE INVENTION

The present invention is a disc drive system which includes appropriate circuitry or an algorithm to implement an improved dithering technique. More specifically, the disc drive system includes a disc having a disc surface and at least one transducing head which flies adjacent the disc surface. The disc spins and the head is moved radially by an actuator arm connected to the distal end of an actuator. Dither circuitry is used to periodically control movement of the head through the actuator during periods of inactivity such that the head flies over non-textured areas on the disc surface. Various embodiments of the invention include positioning the head to reduce localized head and media wear, switching between heads which are used to retrieve servo position information, positioning the head to increase fly height, positioning the head in a manner to clear debris which has accumulated on the head, positioning the head to reduce average access time following a dither operation and positioning the head to reduce power consumption. The invention can be implemented in any appropriate circuitry which includes hardware, software, firmware and their combination.

DETAILED DESCRIPTION OF THE PREFERRED EMBODIMENTS

Figure 1:
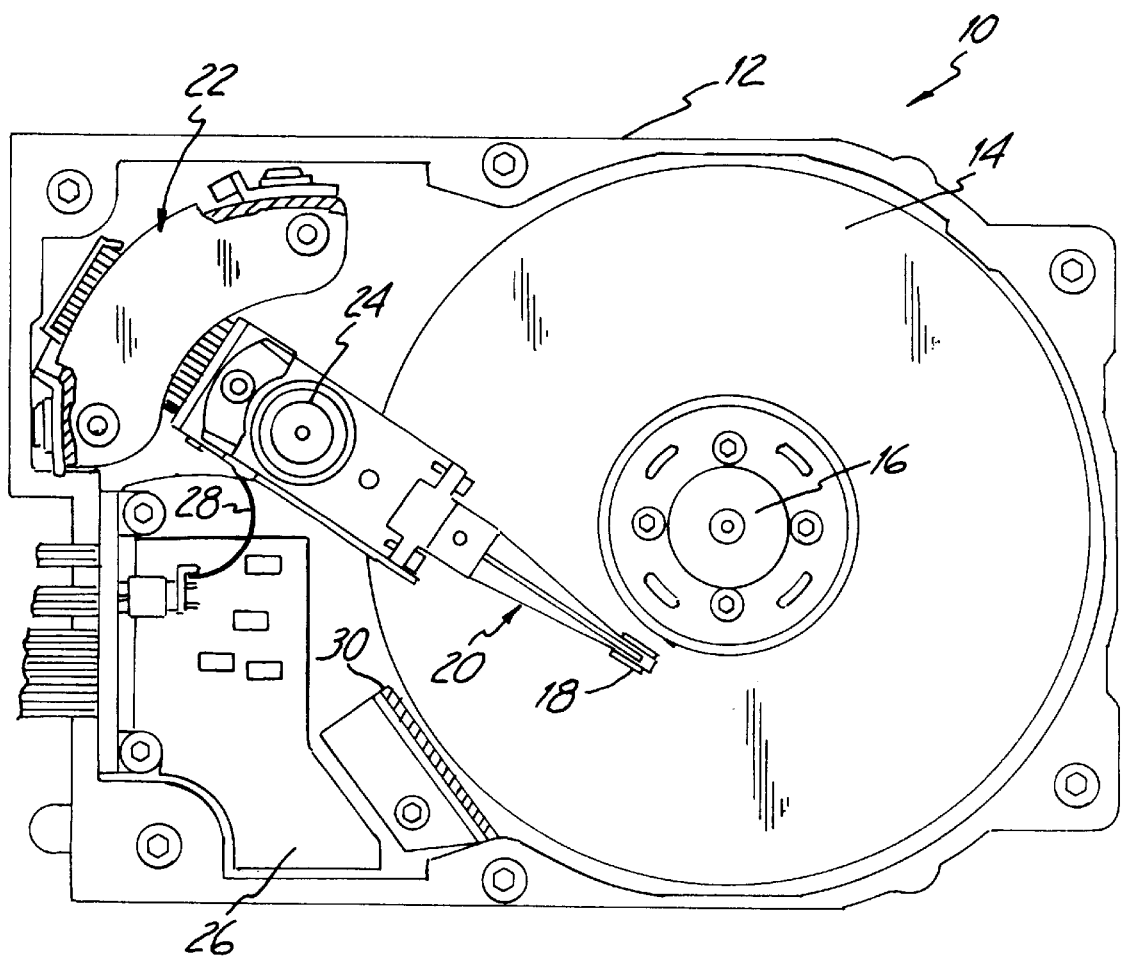
FIG. 1 is a top plan view of a disc drive system in accordance with the present invention.
Figure 2:
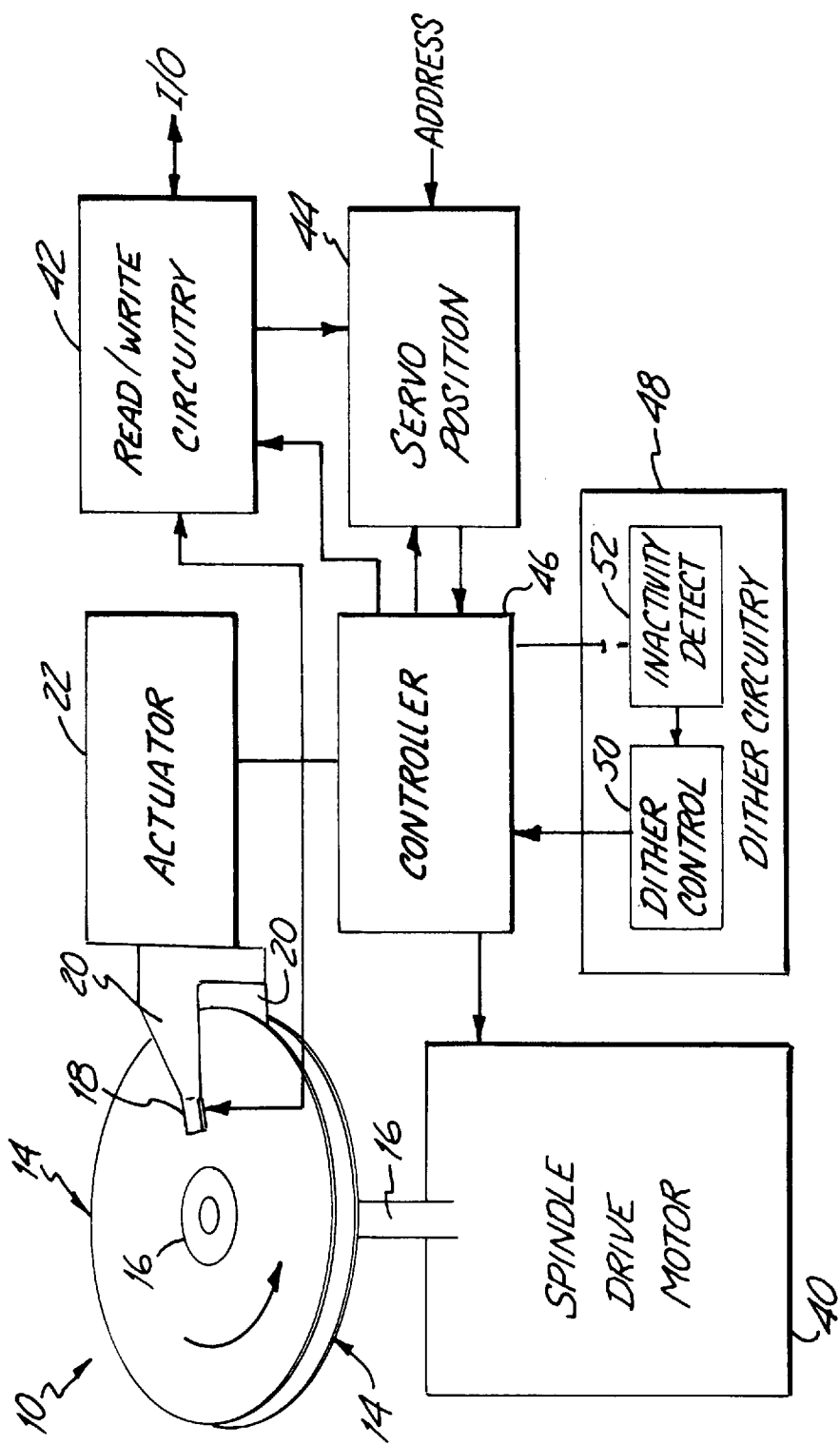
FIG. 2 is a simplified block diagram showing circuitry to implement the present invention.

FIG. 1 is a top plan view of a magnetic disc storage system 10 which operates in accordance with the dithering of the present invention. The magnetic disc storage system 10 includes chassis 12 which carries rotatably magnetic discs 14 on spindle 16. A magnetic transducing head 18 is positioned over a surface of disc 14 and is carried on the distal end of actuator arm 20 which couples to actuator 22 and moves about spindle 24. As shown in FIG. 2, a plurality of discs 14 and heads 18 may be used in the invention and information may be stored on both sides of disc 14. Disc circuitry 26 is carried in chassis 12 and couples to actuator 22 and to head 18 through flex circuit 28. An air filter 30 is positioned along the side of disc 14.

FIG. 2 is a simplified block diagram of disc drive system in accordance with the present invention. As shown in FIG. 2, system 10 includes a plurality of discs 14 stacked one upon the other, all carried on spindle 16 which couples to spindle drive motor 40. A plurality of heads 18 carried on actuator arm 20 are positioned over surfaces of discs 14 and used for reading and writing information. Heads 18 are positioned on both sides of each disc 14. Disc storage system 10 includes circuitry 26 which includes read/write circuitry 42, servo position circuitry 44, disc controller 46 and dither circuitry 48 in accordance with the present invention.

In operation, spindle drive motor 40 spins discs 14 at a high rate of rotation. The relative movement between heads 18 over the surfaces of discs 14 causes heads 18 to "fly" slightly above the disc surface. Heads 18 are transducing heads capable of reading and writing information on the surfaces of discs 14. Servo information is also carried on the surfaces of discs 14 and used to determine the position of head 18. In one embodiment, this may be embedded servo data. Information is read back from discs 14 by providing address information to servo position circuitry 44 which, based upon read back servo information, instructs controller 46 to position head 18 at the appropriate location using actuator 22. Information is then read back using read/write circuitry 42. A similar process is used to write information.

Circuitry 26 includes dither circuitry 48 in accordance with the present invention. Dither circuitry 48 includes dither control circuitry 50 and inactivity detection circuitry 52. We have discovered a new dithering process for use in a magnetic storage system in which the transducing heads 18 are positioned at different radial locations during periods of inactivity. In the present invention, dither control circuitry 50 is activated when the disc storage system 10 has been in an idle state (i.e. no active commands outstanding to the host system). The present invention is particularly well suited for system(s) 10 which use magnetoresistive heads, embedded servo data and/or textured media.

In its basic form, dithering consists of having the head seek to a random disc drive cylinder (i.e. track) location in order to reduce localized wear. Dithering is done at a specific time interval after a specified period of disc inactivity has occurred at which time the head is randomly moved to a cylinder for a random period of time. Typically, movement of the head during dithering has been between tracks which are selected to reduce power consumption and/or increase the fly height above the storage media. However, we have recognized new implementations of dithering which provide further benefits.

One aspect of the present invention includes controlling dithering (i.e. positioning of the head during idle periods) based upon the location of textured media on the surface of a disc 14. Textured media refers to an area on the surface of the disc 14 which is intentionally formed such that it is not perfectly smooth. This area is then used as a landing zone for placement of the head when disc 14 is not spinning. The textured surface of the media prevents heads 18 from sticking to the surface of disc 14 when spindle drive motor 40 is not rotating. However, when the heads 18 are flying, contact with the surface is less likely to occur if the head is positioned over the smooth data zone of a disc 14 then if the head is positioned over the textured zone. Thus, one aspect of the invention includes dithering in a way which reduces the time during which the head 18 is positioned over the textured surface.

Some present disc drive systems employ heads which use magnetoresistive elements for read back of information such magnetoresistive elements may experience electromigration. Electromigration is a phenomenon in which the wires which attach to the magnetoresistive element and the magnetoresistive element are of dissimilar metals which can cause the metals at the interface to migrate, leading to an open circuit. Thus, the connection to the magnetoresistive element may have a limited life, and may experience degradation whenever the head is in use. However, many disc systems use embedded servo data in which servo position information is carried on a surface of the discs along with the user information. In such an embodiment, a head must be selected almost all of the time in order to maintain servo position. One aspect of the invention includes equalizing such wear upon all of the heads during dithering. In the present invention, during dithering, the dither circuitry switches between the various heads when reading servo position information, therefore, is better distributed over all of the heads.

Referring back to FIG. 1, the filter 30 is shown adjacent discs 14. As discs 14 spin, air carried in chassis 12 is moved past filter 30 whereby filter 30 collects debris and other particles in chassis 12, and thereby maintains a relatively particle free environment. During operation of the disc storage system 10, loose particles and other materials such as lubrication within the disc drive may accumulate on head 18 and the slider assembly which carries head 18. One aspect of the present invention includes periodically clearing this debris so that it can be pulled away by the air flow from the rotating discs and into filter 30. This is achieved by modifying the dither procedure such that during a dither operation head 18 is periodically moved to an inner or outer track such that accumulated debris is cleared from head 18.

The present invention also addresses issues of power reduction during dithering. Specifically, there is force and drag from air flow near the inner tracks of the disc which increases power consumption. Further, flex cable 30 places a force on actuator arm 20 which can cause increased power consumption. The invention includes recognition of this increase in power consumption and attempts to reduce it when dithering.

Another aspect of the invention includes reducing seek time following a dither operation. Specifically, this is achieved by more heavily weighting tracks near the middle radius of disc 14.

In the present invention, the dithering algorithm addresses a number of concerns including the textured zone of the media and the use of magnetoresistive heads with embedded servo data. Furthermore, the invention provides periodic track changes to reduce local media wear, attempts to increase the fly height during dithering, performs periodic sweep seeks to the inner and outer radius of the disc to clear any accumulated debris, reduces power consumption by dithering to low power areas and minimizes average access seek time by dithering near the middle track of the disc. The above goals cannot be achieved simultaneously. However, the present invention provides an efficient compromise between all of these goals. We have ranked these goals in accordance with their importance as follows:

1. Periodic track changes to reduce localized head and media wear.
2. (Tie) Dither to tracks where 100% of the slider is in the non-textured (data) area.
2. (Tie) Periodic head changes to reduce localized head wear.
3. (Tie) Dither to area where fly-height is maximum.
3. (Tie) Periodic seeks to inner and outer radii to clear any accumulated debris on head/slider assembly.
4. Dither near middle radius to minimize average access time from dither.
5. Minimize power consumption by dithering to low power areas.

Based on the ranking of these goals, a dithering track range in accordance with the present invention was determined. Specifically, we performed an analysis to determine the optimal track range to meet the design criteria. The analysis was done using a generic disc drive system. This provides a generic analysis that should apply to current and future generation magnetic disc storage systems. Table 1 outlines the above goals and their optimal track range:

TABLE 1

| Design Goal | Optimal Track Range |
| --- | --- |
| 1. Periodic track changes to reduce localized head and media wear. | All tracks. |
| 2. (Tie) Dither to tracks where 100% of the slider is in the non-textured (data) area. | All tracks except the one header/slider width at innermost radius (nearest the spindle motor). For example, the 300 innermost tracks. |
| 2. (Tie) Periodic head changes to reduce localized head wear. | All tracks. |
| 3. (Tie) Dither to area where fly-height is maximum. | Approximate 10% higher fly-height at outer radius, skew range toward outer radius. |
| 3. (Tie) Periodic seeks to inner and outer radii to clear any accumulated debris on head/slider. | Innermost 200 tracks and outermost 200 tracks. |
| 4. Dither near middle | ½ radius. |

TABLE 1-continued

| Design Goal | Optimal Track Range |
|---|---|
| radius to minimize average access time from dither. | |
| 5. Minimize power consumption by dithering to low power areas. | Windage drag is worst at inner radius, optimal is ½ radius to outermost radius. |

Figure 3:
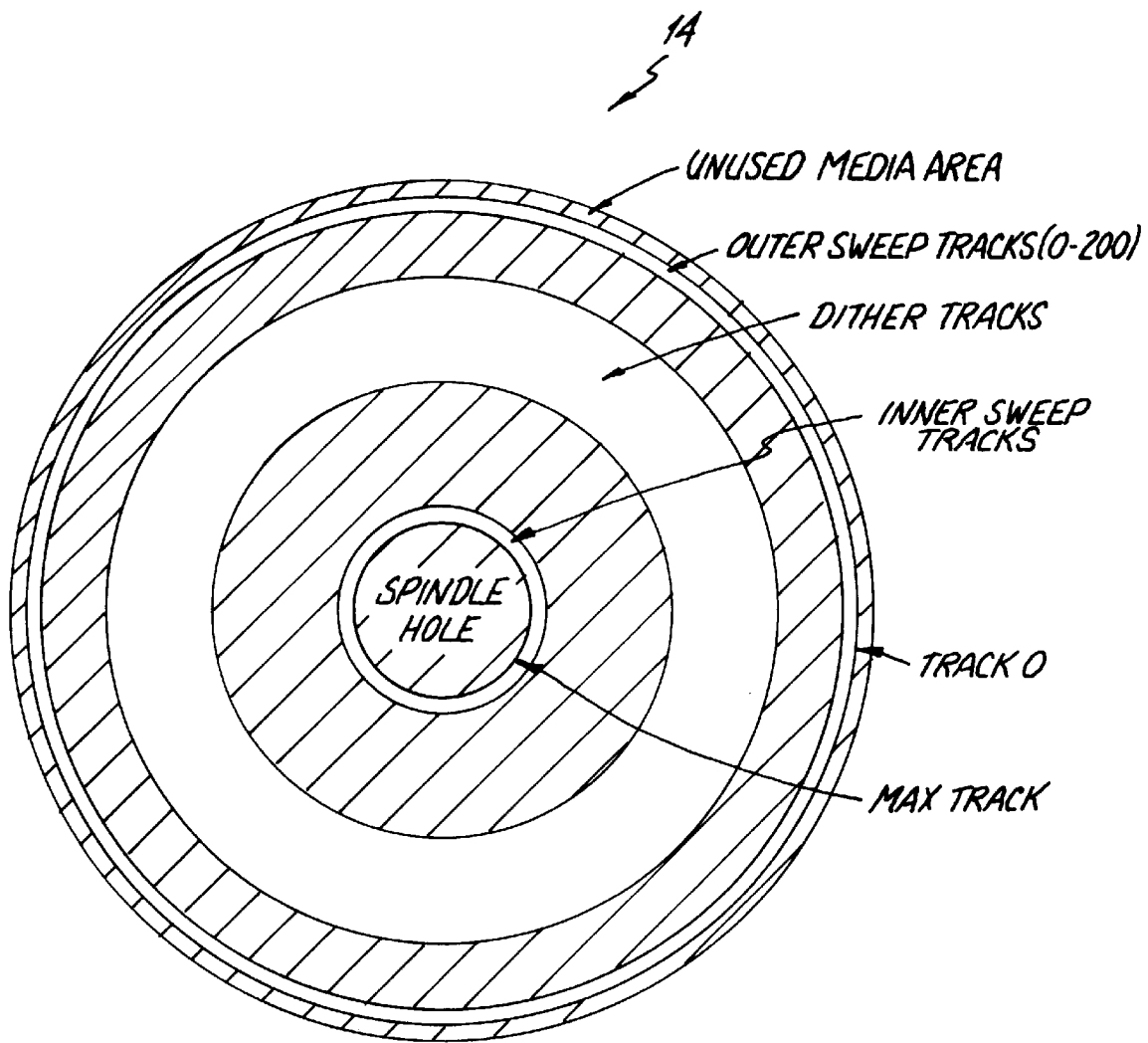
FIG. 3 is a top plan view of a surface of a magnetic storage disc showing different areas of the disc surface used to perform a dithering operation in accordance with the invention.

FIG. 3 is a top plan view of disc 14 used to illustrate the various areas on the disc surface for use in dithering in accordance with the invention. Starting at the outer radius, there is an unused media area followed by an outer sweep area on tracks 0 through 200. The dither tracks are shown toward the middle radius of disc 14. The inner sweep track and maximum track are shown at the inner radius of disc 14. Based upon the above criteria and analysis, the dither track ranges (i.e., a dither region) were defined as follows:

Dither Seek Track Number Range: (½*Max User Track) to (⅓*Max User Track). Note that the outermost radius is track 0 while the inner radius contains Max User Track and the textured landing zone.

Outer Sweep Track Number Range: Track 0 to Track 200.

Inner Sweep Track Number Range: Max user track to (max user track—200).

These criteria can be implemented to provide an improved dithering algorithm in accordance with the present invention.

Figure 4:
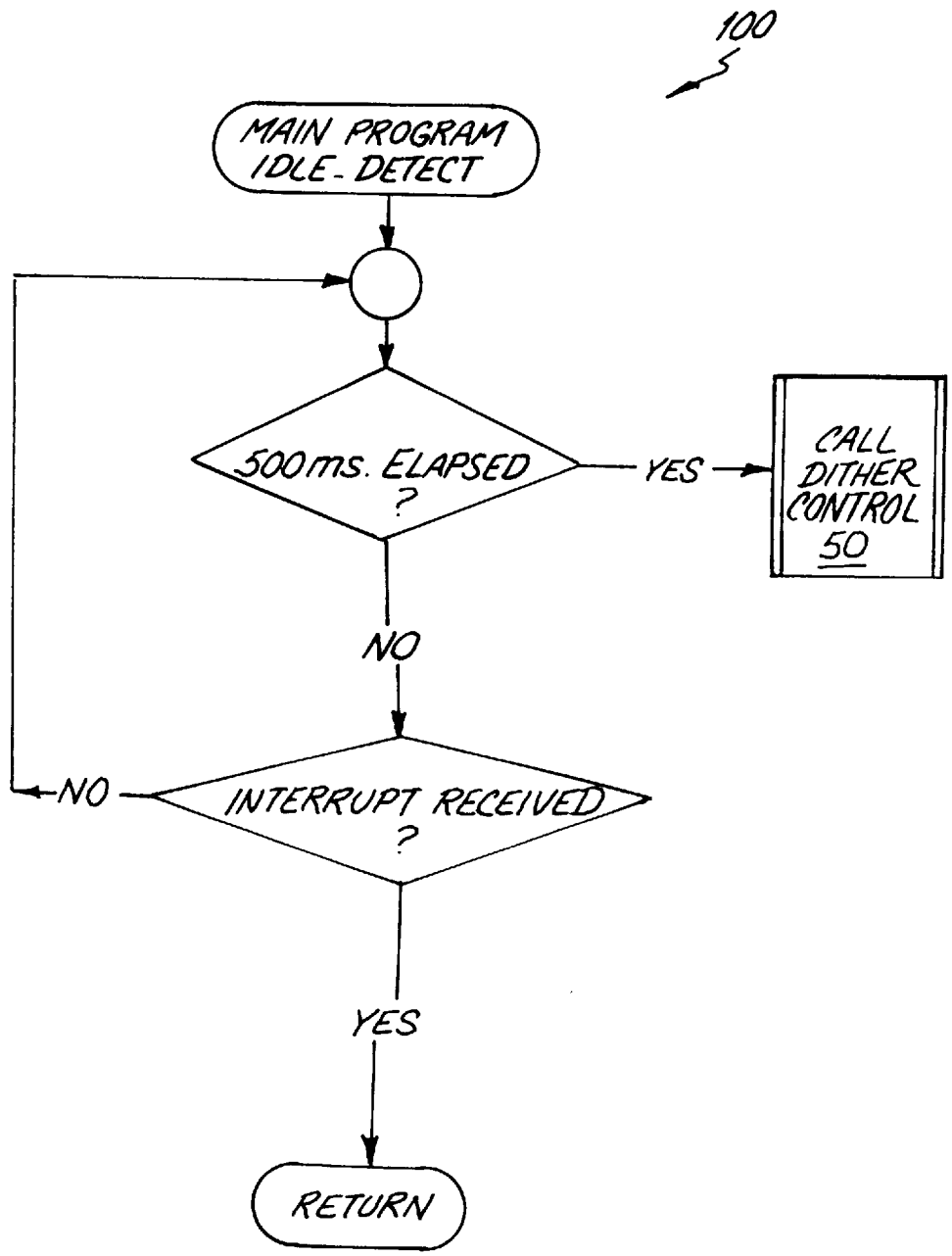
FIG. 4 is a simplified block diagram showing an inactivity detection flow chart.

FIG. 4 is a simplified flow chart 100 showing operation of disc drive system 10. Flow chart 100 is implemented in circuitry 26 shown in FIG. 2. It will be understood by those skilled in the art that circuitry 26 is a simplified schematic representation of the electronic circuitry used in disc drive system 10. For example, the various elements shown in circuitry 26 can be implemented using individual components or using a microprocessor-based system and appropriately programmed software. FIG. 4 is a flow chart 100 which implements inactivity detect circuitry 52, shown in FIG. 2. FIG. 4 is a loop which monitors for an interrupt such as caused when an interface command or other interrupt is received by disc system 10. If 500 milliseconds elapse without an interrupt, flow chart 100 passes control to dither control 50 and a dithering algorithm in accordance with the present invention is initiated.

Figure 5:
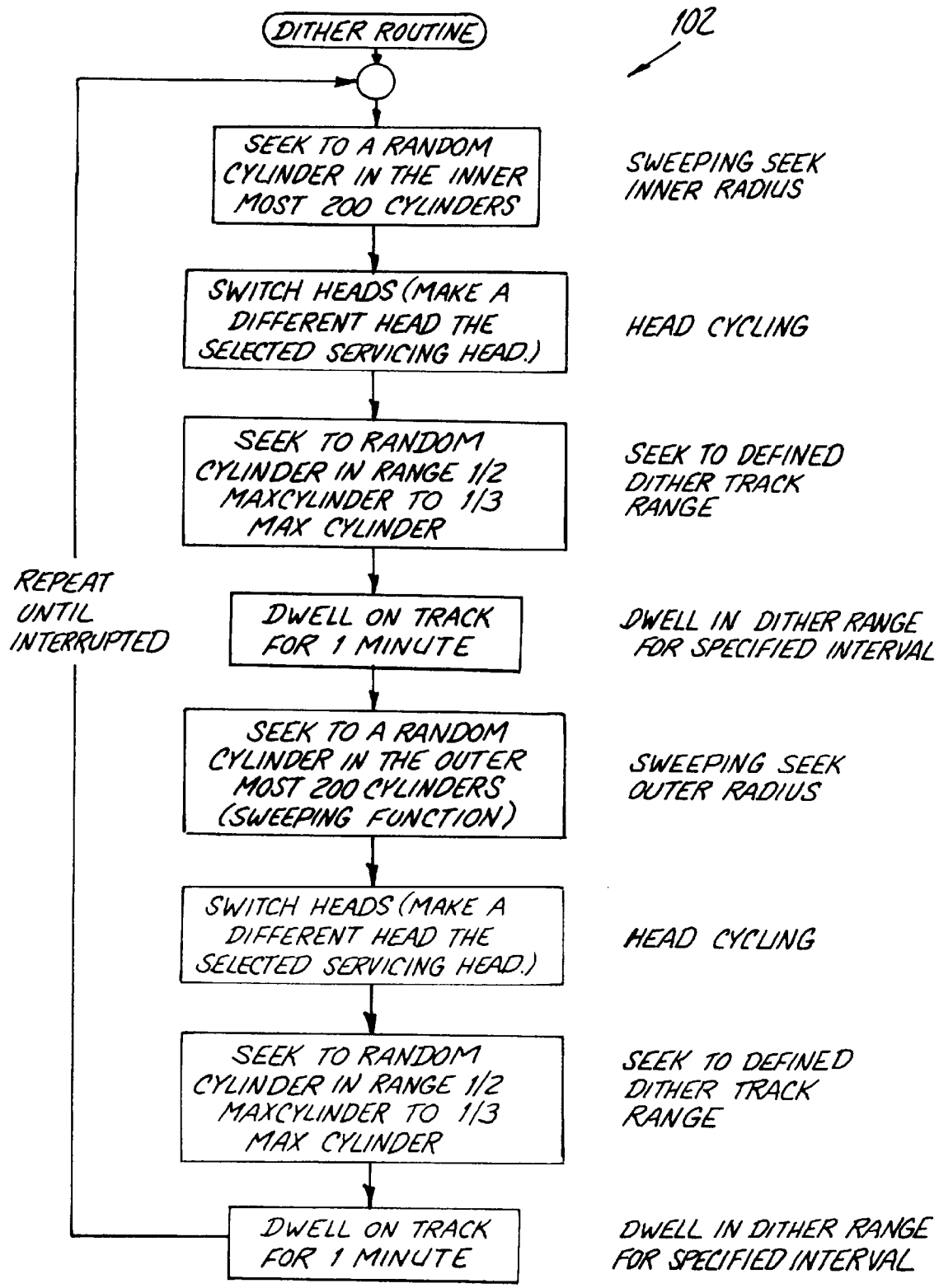
FIG. 5 shows a block diagram of a dither algorithm implemented in accordance with the invention.

Dither control flow chart 102 is shown in FIG. 5 and is used to implement dither control circuitry 50 shown in FIG. 2. Upon initiation of dither control, controller 46 is caused to move head 18 to a random cylinder or track located in the innermost 200 cylinders. This causes an initial sweeping seek to the inner radius to clear debris. It will be understood that if an interrupt is detected, control will be transferred from chart 102 and returned to normal reading and writing operations. Next, after seeking to a random inner cylinder, a different head 18 is selected for reading servo data. This is also called head cycling. A seek to a random cylinder is then performed where the random cylinder is between one-half times max cylinder and one-third times max cylinder, as described above. The head is then allowed to dwell on this track for a specified interval such as one minute. A sweeping movement is next performed by moving head 18 to a random cylinder in the outermost 200 cylinders to thereby free debris which may have been deposited upon the head. Another head cycling is performed and a different head is selected for retrieving servo data. Another seek is performed to a random cylinder in the defined dither track range, i.e. between one-half times max cylinder and one-third times max cylinder. The head is allowed to dwell on this track for a specified time period, such as one minute, at which time the dither algorithm is repeated. Note that the time periods used herein may be changed as appropriate or set to be random or weighted random times.

In one implementation of the above-described algorithm, the following was observed:

1. Sweep seeks alternated between inner 200 cylinders and outer 200 cylinders.
2. The sweep seeks were random in the range.
3. The dither seeks occurred in the ½ to ⅓ range.
4. The dither seeks were random in the range.
5. All heads were selected in head cycling.
6. Dither was invoked after 500 msec. of inactivity.
7. Dither sweeps and dither seeks occurred at 1-minute intervals.

Although the present invention has been described with reference to preferred embodiments, workers skilled in the art will recognize that changes may be made in form and detail without departing from the spirit and scope of the invention. For example, it will be understood that the present invention may be implemented using any appropriate circuitry, hardware, software or their combination. Further, although specific tracks, time periods and order of significance of various dither criteria have been set forth herein, it will be understood that these may be modified to meet the demands or desires of any disc drive system.

What is claimed is:

1. A magnetic disc storage system for storing magnetically encoded information, comprising:

a magnetic disc having a disc surface for carrying the magnetically encoded information on a plurality of annular tracks including an outer track of maximum radius, the disc surface further including an annular textured zone and a dither region interposed between and spaced apart from the annular textured zone, and the outer track;

a spindle motor coupled to the disc to thereby cause rotation of the disc;

a head proximate the disc surface adapted for flying over the disc surface as the disc rotates and providing a readback signal in response to the magnetically encoded information;

an actuator coupled to the head to move the head in a radial direction thereby moving the head over the plurality of tracks and the textured zone;

readback circuitry coupled to the readback signal for processing the readback signal and providing an information output;

dither circuitry coupled to the actuator to periodically move the head over different tracks in the dither region while avoiding the textured zone during periods of inactivity.

2. The magnetic disc storage system of claim 1 including an inactivity detection means for detecting periods of inactivity and responsively actuating the dither circuitry.

3. The magnetic disc storage system of claim 1 including a plurality of disc surfaces which carry servo data and a plurality of heads proximate the disc surfaces for reading the servo data wherein the dither circuitry switches between the plurality of heads to read servo data.

4. The magnetic disc storage system of claim 3 wherein the heads comprise magnetoresistive heads.

5. The magnetic disc storage system of claim 1 wherein the dither circuitry moves the head over tracks which are selected based upon fly height of the head over the disc surface.

6. The magnetic disc storage system of claim 1 wherein the dither circuitry periodically moves the head to an inner or outer track in the dither region on the disc surface to thereby clear debris which has accumulated on the head.

7. The magnetic disc storage system of claim 1 wherein the dither region is defined by tracks which have a track number which is greater than ⅓ of a maximum useable track and less than ½ of the maximum useable track where the outer track has a track number of zero.

8. The magnetic disc storage system of claim 1 wherein the different tracks are selected to reduce power consumption.

9. The magnetic disc storage system of claim 1 wherein the dither circuitry moves the head to random tracks in the dither region.

10. A method of controlling movement of a head over a disc surface in a magnetic disc storage system, comprising:
   a) detecting a period of inactivity;
   b) repeatedly, periodically moving the head to different tracks in a dither region disposed between and spaced from a first track of minimum radius on the disc surface and a second track of maximum radius on the disc surface during the period of inactivity.

11. The method of claim 10 including selecting a head from a plurality of heads for reading servo data during the period of inactivity.

12. The method of claim 10 including moving the head to a track selected based upon head fly height.

13. The method of claim 10 including moving the head to an inner or outer track in the dither region to clear debris accumulated on the head.

14. The method of claim 10 including moving the head to a track selected to reduce access time during a subsequent period of activity.

15. The method of claim 10 including moving the head to a track selected to reduce power consumption.

16. The method of claim 10 wherein the dither region comprises tracks which have a radius which is greater than about ½ of a maximum useable track radius and less than about ⅔ of the maximum useable track radius.

17. The method of claim 10 wherein the different tracks are random tracks within the dither region.

* * * * *